(12) United States Patent
Ohno et al.

(10) Patent No.: US 8,481,454 B2
(45) Date of Patent: *Jul. 9, 2013

(54) HONEYCOMB STRUCTURE

(75) Inventors: Kazushige Ohno, Ibi-gun (JP);
Kazunori Yamayose, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 258 days.

This patent is subject to a terminal disclaimer.

(21) Appl. No.: 12/779,006

(22) Filed: May 12, 2010

(65) Prior Publication Data

US 2010/0247406 A1    Sep. 30, 2010

Related U.S. Application Data

(63) Continuation of application No. PCT/JP2008/056405, filed on Mar. 31, 2008.

(51) Int. Cl.
*B01J 23/00* (2006.01)

(52) U.S. Cl.
USPC .......... 502/351; 502/527.19; 55/522; 55/523; 55/524; 55/527; 264/629; 264/630; 423/598

(58) Field of Classification Search
USPC .............. 60/299, 311; 55/484, 522–524, 527; 502/527.19, 350, 351; 264/629, 630; 423/598
See application file for complete search history.

(56) References Cited

U.S. PATENT DOCUMENTS

| | | | |
|---|---|---|---|
| 7,341,614 B2 * | 3/2008 | Hayashi et al. | ............... 55/523 |
| 2005/0120690 A1 | 6/2005 | Noguchi et al. | |
| 2006/0021309 A1 | 2/2006 | Merkel | |
| 2006/0064957 A1 | 3/2006 | Ogunwumi et al. | |
| 2006/0254231 A1 * | 11/2006 | Hayashi et al. | ............... 55/523 |
| 2007/0033912 A1 | 2/2007 | Furukawa et al. | |
| 2007/0214759 A1 | 9/2007 | Merkel | |
| 2008/0092499 A1 | 4/2008 | Otsuka et al. | |

FOREIGN PATENT DOCUMENTS

| | | |
|---|---|---|
| EP | 2221287 | 8/2010 |
| JP | 07-138083 | 5/1995 |
| JP | 2001-261463 | 9/2001 |
| JP | 2003-135918 | 5/2003 |
| JP | 2003-193820 | 7/2003 |
| JP | 2004-901 | 1/2004 |

(Continued)

OTHER PUBLICATIONS

International Search Report for corresponding International Application No. PCT/JP2008/056405, Dec. 22, 2008.

*Primary Examiner* — Kaj K Olsen
*Assistant Examiner* — Pritesh Darji
(74) *Attorney, Agent, or Firm* — Ditthavong Mori & Steiner, P.C.

(57) ABSTRACT

A honeycomb structure includes aluminum titanate and cell walls. The cell walls extend along a longitudinal direction of the honeycomb structure to form a plurality of cells between the cell walls. A porosity of the honeycomb structure is from about 40% to about 60%. In a binary image of substrate portions and pore portions of each of the cell walls, an area ratio (%) of the pore portions to a whole area in a rectangularly-divided image is in a range from (the porosity–about 25%) to (the porosity+about 25%). The binary image is converted from a microscopic image of a cross section of each of the cell walls in parallel with the longitudinal direction. The rectangularly-divided image is formed by dividing the binary image in a direction parallel to a thickness direction of each of the cell walls at a predetermined width.

28 Claims, 8 Drawing Sheets

FOREIGN PATENT DOCUMENTS

| | | |
|---|---|---|
| JP | 2005-519834 | 7/2005 |
| JP | 2007-296512 | 11/2007 |
| WO | WO 03/078352 | 9/2003 |
| WO | WO 2005/009922 | 2/2005 |
| WO | WO 2006/030811 | 3/2006 |
| WO | WO 2007/064454 | 6/2007 |
| WO | WO 2008/005249 | 1/2008 |

* cited by examiner

D-D line cross-sectional view

C-C line cross-sectional view

Relationship between difference between area ratio of pore portions and porosity and breaking strength

HONEYCOMB STRUCTURE

CROSS-REFERENCE TO RELATED APPLICATIONS

This application is a continuation application of International Application No. PCT/JP2008/056405 filed on Mar. 31, 2008. The contents of this application are incorporated herein by reference in their entirety.

BACKGROUND OF THE INVENTION

1. Field of the Invention

The present invention relates to a honeycomb structure.

2. Discussion of the Background

Exhaust gas discharged from internal combustion engines, such as diesel engines, contains particulate matter (hereinafter, also referred to as "PM"). The PM has harmful effects on the environment and the human bodies, and thus the PM has been a recent issue.

In order to capture PM in exhaust gas to purify the exhaust gas, various honeycomb filters have been proposed as filters. These honeycomb filters each include a honeycomb structure made of a material such as cordierite, silicon carbide, or aluminum titanate.

A honeycomb structure including aluminum titanate has a melting temperature higher than that of a honeycomb structure including cordierite. It is therefore known that the honeycomb structure including aluminum titanate is less likely to be damaged by melting upon burning PM in the case where the honeycomb structure is used as a honeycomb filter. In addition, the honeycomb structure including aluminum titanate has a coefficient of thermal expansion lower than that of a honeycomb structure including silicon carbide. It is therefore known that the honeycomb structure including aluminum titanate is less likely to be damaged by heat applied upon burning PM even in the case where the honeycomb structure is used as a large-size filter.

Since aluminum titanate has anisotropy in crystallographic axes, fine cracks occur in the honeycomb structure including aluminum titanate. Thus, disadvantageously, it is considered that the honeycomb structure including aluminum titanate is made to have a low breaking strength and is likely to be decomposed by heat.

US 2006/0021309A discloses a honeycomb filter which includes a honeycomb structure mainly including aluminum titanate and showing small variation in the pore diameter distribution. The honeycomb structure is manufactured as follows: a material mixture mainly composed of $Al_2O_3$ and $TiO_2$ is prepared; an oxide of a substance such as Bi, Ca, or Y is added to the material mixture; and the resulting mixture is fired.

The contents of US2006/0021309A are incorporated herein by reference in their entirety.

SUMMARY OF THE INVENTION

According to one aspect of the present invention, a honeycomb structure includes aluminum titanate and cell walls. The cell walls extend along a longitudinal direction of the honeycomb structure to form a plurality of cells between the cell walls. A porosity of the honeycomb structure is from about 40% to about 60%. In a binary image of substrate portions and pore portions of each of the cell walls, an area ratio (%) of the pore portions to a whole area in a rectangularly-divided image is in a range from (the porosity−about 25%) to (the porosity+about 25%). The binary image is converted from a microscopic image of a cross section of each of the cell walls in parallel with the longitudinal direction. The rectangularly-divided image is formed by dividing the binary image in a direction parallel to a thickness direction of each of the cell walls at a predetermined width.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1A:
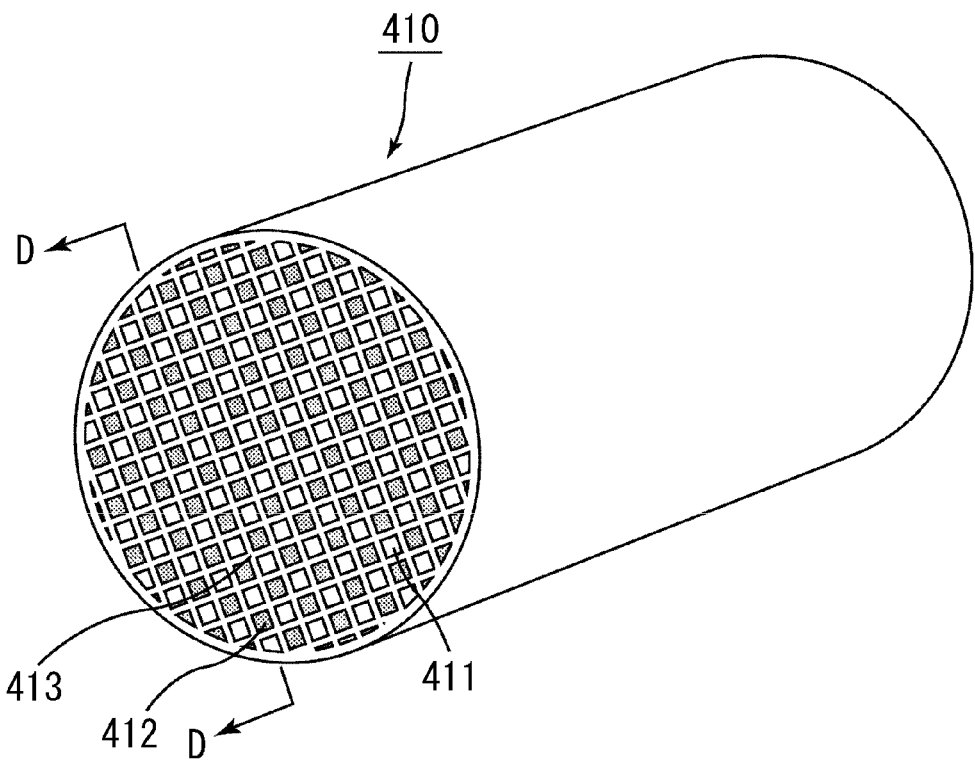
FIG. 1A is a perspective view that schematically shows a conventional honeycomb structure mainly including aluminum titanate.
Figure 1B:
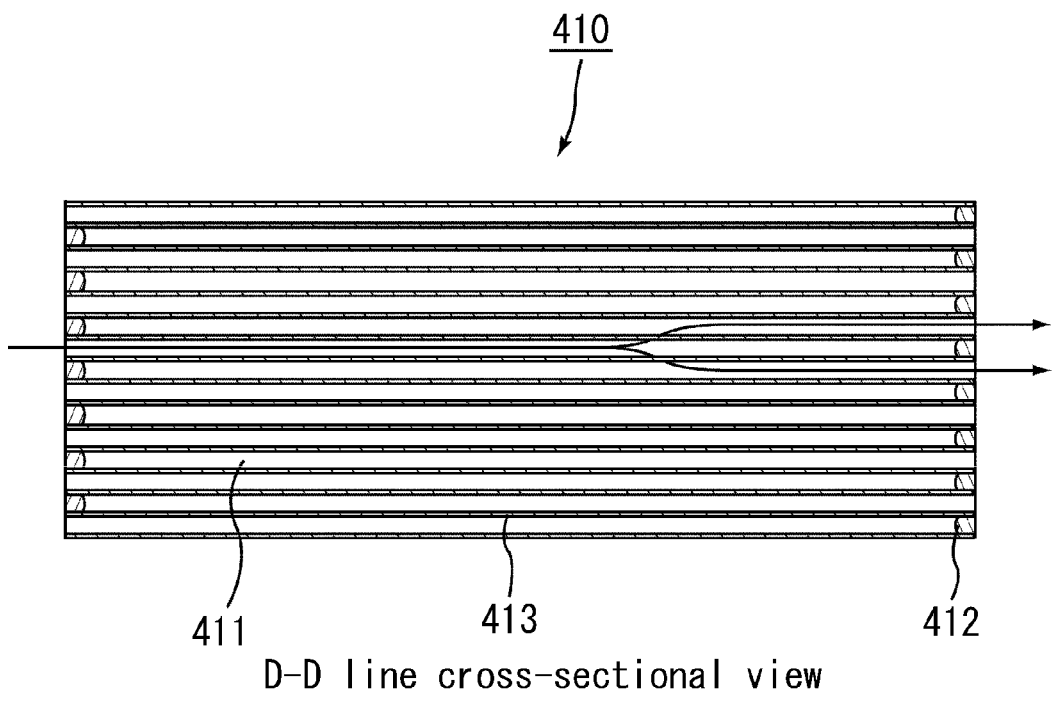
FIG. 1B is a cross-sectional view (the D-D line cross-sectional view of FIG. 1A) that schematically shows a cross section of the cell wall exposed by cutting the cell wall in parallel with the longitudinal direction of the conventional honeycomb structure of FIG. 1A.

FIG. 1A is a perspective view that schematically shows a conventional honeycomb structure mainly including aluminum titanate. FIG. 1B is a cross-sectional view (the D-D line cross-sectional view of FIG. 1A) that schematically shows a cross section of the cell wall exposed by cutting the cell wall of the conventional honeycomb structure shown in FIG. 1A in parallel with the longitudinal direction.

FIG. 1B shows that a honeycomb structure 410 mainly including aluminum titanate has cells 411 which are formed in the longitudinal direction with cell walls 413 interposed therebetween, and that the cell walls 413 separating the cells 411 functions as a filter.

More specifically, in the honeycomb structure 410, each of the cells 411 is sealed with a plug 412 at either one end of an inlet side (flow-in side) or an outlet side (flow-out side) of exhaust gas so that a check pattern is formed as a whole. Exhaust gas flowing into one cell is always caused to pass through the cell wall 413 which separates the one cell from other cells, and then is discharged from the other cells. When the exhaust gas passes through the cell wall 413, PM is captured in the cell wall 413, and thus the exhaust gas is purified.

The exhaust-gas purifying filter including the honeycomb structure which mainly includes aluminum titanate and is disclosed in US 2006/0021309A does not have a sufficiently high PM capture efficiency, although pores each have a similar size. Further, the exhaust-gas filter does not have a sufficiently high breaking strength. Thus, there are demands for further improvement of the PM capture efficiency and breaking strength.

In order to solve these problems, the present inventors have studied the honeycomb structure mainly including aluminum titanate. As a result of observing the cross section of the cell wall of the honeycomb structure with an electron microscope, the present inventors have found that the cell wall has the portion where many pores exist and the porosity is locally high (the sparse portion) and the portion where few pores exist and the porosity is locally low (the dense portion).

The exhaust-gas filter including the honeycomb structure with the cell wall including the sparse portions and the dense portions presumably captures PM as follows.

As a model of exhaust gas flowing through the cell wall, here is provided a fragment of the cell wall prepared as follows. The cell wall of the honeycomb structure is cut in the direction parallel to the longitudinal direction so as to expose the cross section, and this cross section is divided into rectangular fragments in the direction parallel to the thickness direction of the cell wall at a predetermined width.

In this case, exhaust gas flows from one cell to another cell in each fragment.

The exhaust gas may easily pass through the cell wall at the sparse portion because the sparse portion has a higher porosity. On the other hand, the exhaust gas may less easily pass through the cell wall at the dense portion because the dense portion has a lower porosity.

This may imply that, in the cell wall including the sparse and dense portions, exhaust gas tends to flow into the sparse portion and hardly flows into the dense portion, so that part of the cell wall is not effectively used upon capturing PM.

Such reasons probably cause a low PM capture efficiency of an exhaust-gas filter including a honeycomb structure with a cell wall including the sparse and dense portions.

The sparse portion inside the cell wall may cause a locally poor strength of the cell wall in the vicinity of the sparse portion; such a portion presumably serves as a starting point of a crack. This is considered to cause a low breaking strength of the honeycomb structure.

A honeycomb structure according to an embodiment of the present invention includes aluminum titanate, wherein a plurality of cells are formed in the longitudinal direction with cell walls interposed therebetween; a porosity is from about 40% to about 60%; and in a binary image consisting of substrate portions and pore portions, an area ratio (%) of the pore portions to the whole area in each rectangularly-divided image is in the range from (the porosity–about 25%) to (the porosity+about 25%), wherein the binary image is converted from a microscopic image of a cross section of the cell wall in parallel with the longitudinal direction, and the rectangularly-divided image is formed by dividing the binary image in the direction parallel to a thickness direction of the cell wall at a predetermined width.

The honeycomb structure according to the embodiments of the present invention has no portion where the porosity is locally about 25% or more higher than that of the honeycomb structure or where the porosity is locally about 25% or more lower than that of the honeycomb structure. Thus, exhaust gas is likely to more uniformly flow through the whole cell wall, and the cell wall of the whole honeycomb structure is effectively used so as to capture PM in the exhaust gas.

Thus, the honeycomb structure including aluminum titanate tends to have a high PM capture efficiency.

This will be described hereinbelow in detail with reference to the drawings.

Figure 2A:
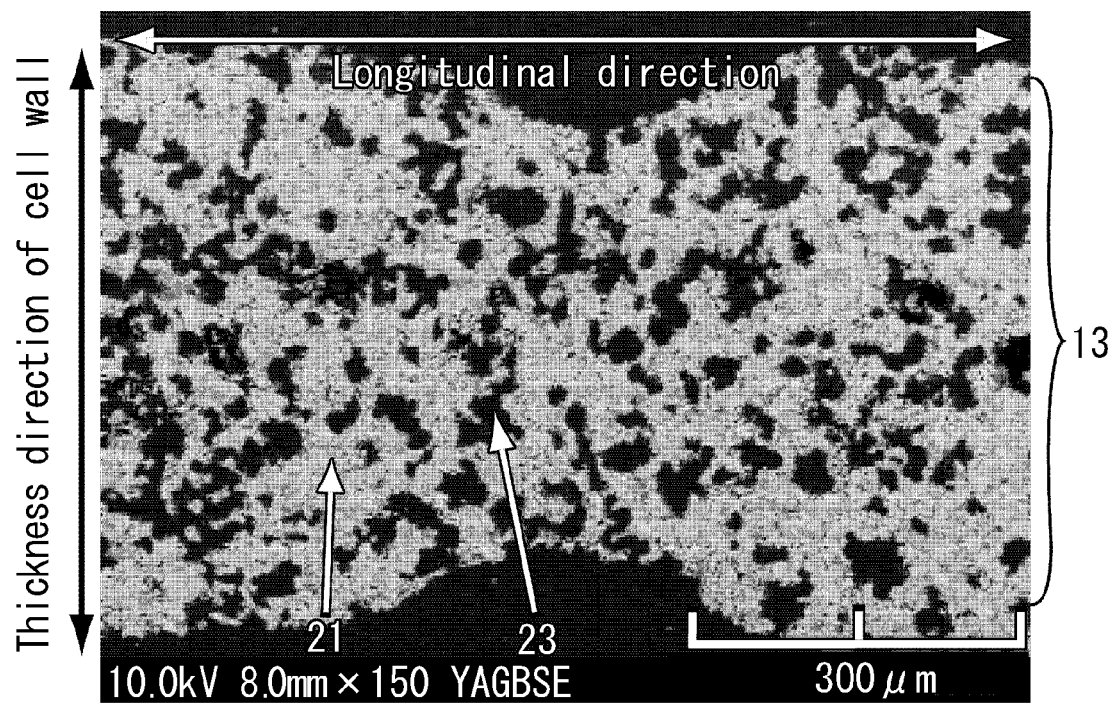
FIG. 2A is a partially enlarged image that shows a part of a cross section of the cell wall exposed by cutting the cell wall in parallel with the longitudinal direction and is photographed by a scanning electron microscope (SEM) (at a magnification of 150×) according to one example of the honeycomb structure according to an embodiment of the present invention.
Figure 2B:
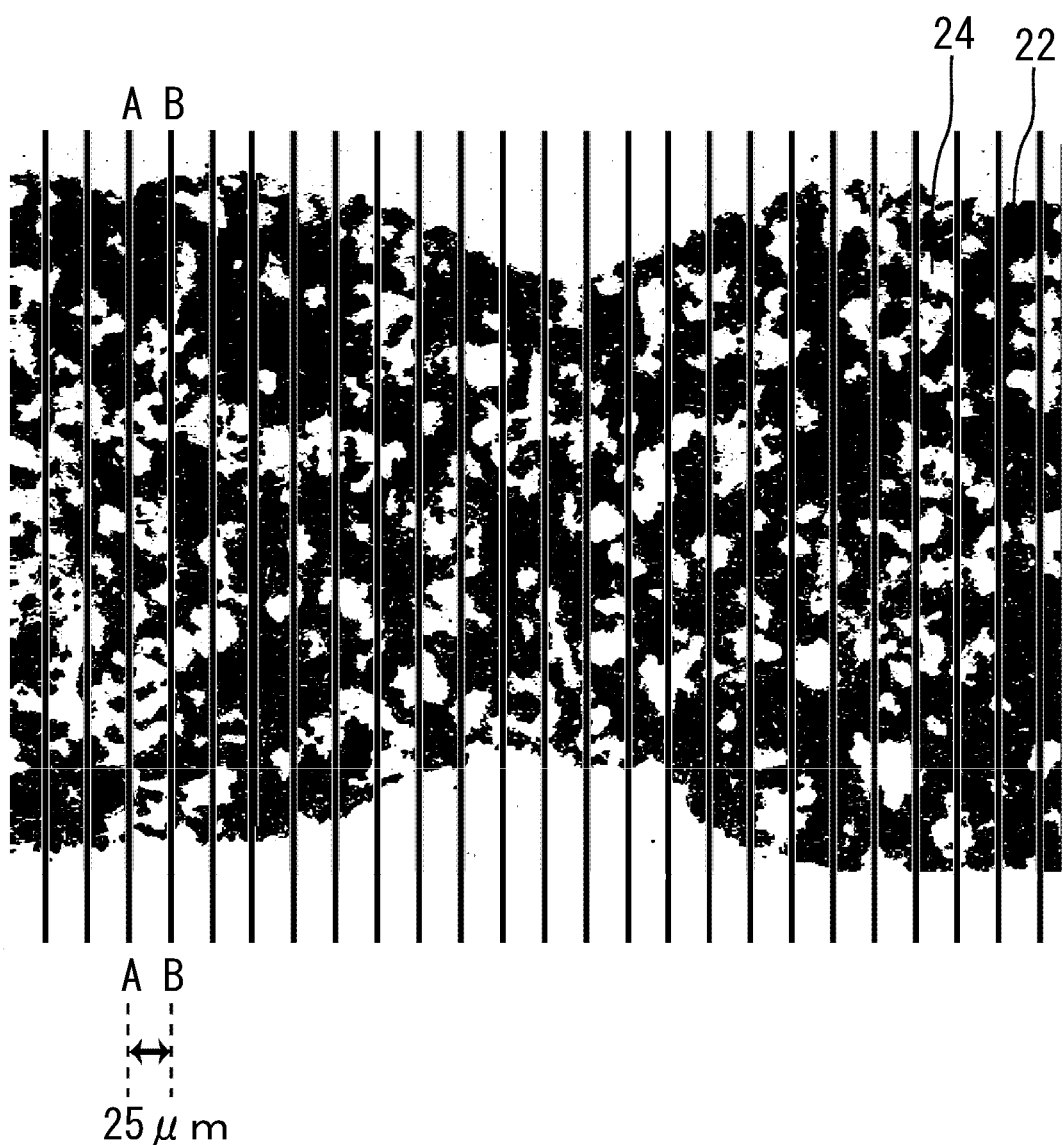
FIG. 2B is a binary image of the partially enlarged image of FIG. 2A, consisting of substrate portions indicating the substrates as blackened portions and of pore portions indicating the pores as whitened portions.

FIG. 2A is a partially enlarged image of apart of a cross section of the cell wall exposed by cutting the cell wall in parallel with the longitudinal direction according to one example of a honeycomb structure according to an embodiment of the present invention. This image is photographed by a scanning electron microscope (SEM) (at a magnification of 150×). FIG. 2B is a binary image of the partially enlarged image of FIG. 2A. In FIG. 2B, the substrates are blackened as substrate portions, while the pores are whitened as pore portions. Thus, these two portions are distinguished from each other.

Figure 2C:
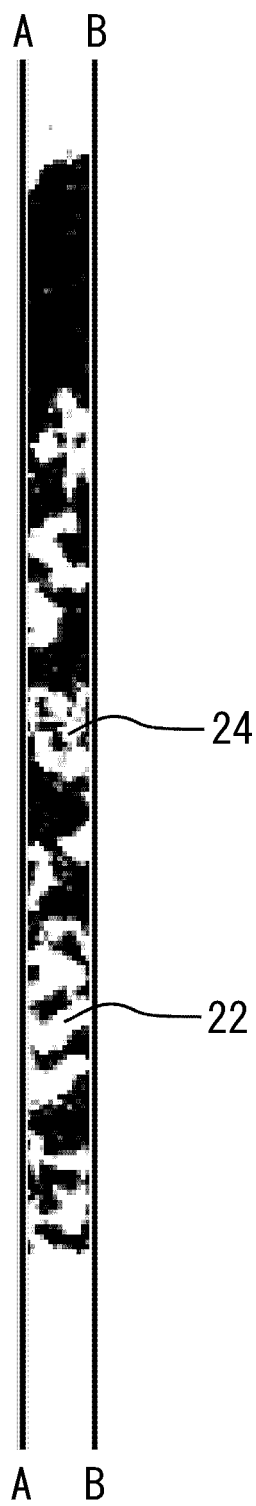
FIG. 2C is a binary image that shows the rectangular region formed by dividing FIG. 2B at the A-A and B-B lines.

FIG. 2C is a binary image that shows the rectangular region formed by dividing FIG. 2B at the A-A and B-B lines.

As shown in FIG. 2A, detail observation of the inside of a cell wall 13 of the honeycomb structure clarifies that the cell wall 13 of the honeycomb structure has substrates 21 made of aluminum titanate and pores 23; that is, the honeycomb structure has a porous structure.

FIG. 2B indicates the lines which rectangularly divide the binary image in the direction parallel to the thickness direction of the cell wall at a predetermined width (about $\frac{1}{10}$ of the thickness of the cell wall, 25 μm width). The "rectangularly" herein means that the binary image is divided so that the divided image has a shape defined by the A-A and B-B lines (the region shown in FIG. 2C).

The following will describe the analysis procedure of the porous structure of the honeycomb structure.

First, the binary image is rectangularly divided. In each of the rectangular regions, substrate portions 22 (black portions) represents the substrates 21 and pore portions 24 (white portions) represents the pores 23. Then, the area of the whole rectangular region, the area of the substrate portions in the rectangular region (the sum of the areas of all the substrate portions), and the area of the pore portions in the rectangular region (the sum of the areas of all the pore portions) are measured.

Here, the ratio (%) of the area of the pore portions in the rectangular region to the area of the whole rectangular region is calculated. This area ratio indicates the porosity in the rectangular region.

The porosity of the whole honeycomb structure is separately measured by a known method such as mercury porosimetry, a weight method, or an Archimedes' method. The honeycomb structure according to the embodiments of the present invention has the porosity measured thereby of from about 40% to about 60%.

Next, the value of the porosity of the honeycomb structure and the value of the area ratio are compared.

In the honeycomb structure according to the embodiments of the present invention, the area ratio (%) of each of the rectangular regions to the porosity is in the range from (the porosity−about 25%) to (the porosity+about 25%).

In other words, every rectangular region in the cell wall has the porosity within the predetermined range.

Thus, the honeycomb structure according to the embodiments of the present invention has no portion where the porosity is locally higher or lower than the porosity of the whole honeycomb structure. Exhaust gas is likely to more uniformly flow through the whole cell wall, and the cell wall of the whole honeycomb structure is effectively used so as to capture PM in the exhaust gas.

Thus, the honeycomb structure including aluminum titanate tends to have a high PM capture efficiency.

In addition, the honeycomb structure according to the embodiments of the present invention has no pore portion where the area ratio of the pore portions is more than about 25% higher than the porosity of the honeycomb structure; such a portion is considered to cause local reduction in strength of the cell wall and to serve as a starting point of a crack. Thus, the honeycomb structure including aluminum titanate tends to have a high breaking strength.

In the honeycomb structure according to the embodiments of the present invention, the area ratio (%) of the pore portions is in the range from (the porosity−about 20%) to (the porosity+about 20%).

In the honeycomb structure according to the embodiments of the present invention, every rectangular region in the cell wall has a porosity adjusted to be within a narrower range. Thus, exhaust gas tends to more uniformly flow through the whole cell wall, and the cell wall of the whole honeycomb structure is more effectively used so as to capture PM in the exhaust gas.

Thus, the honeycomb structure including aluminum titanate tends to have a higher PM capture efficiency.

In addition, this honeycomb structure has no pore portion where the area ratio of the pore portions is more than about 20% higher than the porosity of the honeycomb structure; such a portion is considered to cause local reduction in strength of the cell wall and to serve as a starting point of a crack. Thus, the honeycomb structure including aluminum titanate tends to have a higher breaking strength.

In the honeycomb structure according to the embodiments of the present invention, an average pore diameter is from about 10 μm to about 20 μm, and a total volume of pores having a pore diameter in the range from (the average pore diameter−about 2 μm) to (the average pore diameter+about 2 μm) in a pore diameter distribution is about 60% or more of the whole pore volume.

In the honeycomb structure according to the embodiments of the present invention, the pores occupying about 60% by volume or more of the whole pore volume each have a pore diameter within the range appropriate for capturing PM. Thus, the honeycomb structure has relatively more pores appropriate for capturing PM than others, so that the honeycomb structure including aluminum titanate tends to have a higher PM capture efficiency.

In the honeycomb structure according to the embodiments of the present invention, an average pore diameter is from about 10 μm to about 20 μm, and a total volume of pores having a pore diameter in the range from (the average pore diameter−about 2 μm) to (the average pore diameter+about 2 μm) in a pore diameter distribution is about 70% or more of the whole pore volume.

In the honeycomb structure according to the embodiments of the present invention, the pores occupying about 70% or more of all the pores each have a pore diameter within the range appropriate for capturing PM. Thus, the honeycomb structure has relatively more pores more appropriate for capturing PM than others, so that the honeycomb structure including aluminum titanate tends to have an extremely high PM capture efficiency.

The honeycomb structure according to the embodiments of the present invention has a porosity of from about 40% to about 50%.

The honeycomb structure according to the embodiments of the present invention has no portion where the porosity is locally extremely high. Thus, exhaust gas is likely to more uniformly flow through the whole cell wall, and the cell wall of the whole honeycomb structure is more effectively used so as to capture PM in the exhaust gas.

Thus, the honeycomb structure including aluminum titanate tends to have a high PM capture efficiency.

In addition, the honeycomb structure according to the embodiments of the present invention has a porosity of about 50% or less, so that the honeycomb structure has a sufficient strength. Thus, the honeycomb structure including aluminum titanate tends to have a higher breaking strength.

In the honeycomb structure according to the embodiments of the present invention, each of the cells is sealed at either one end.

The honeycomb structure with each of the cells sealed at either one end tends to be used as a filter for purifying exhaust gas.

Referring to the drawings, the following will describe a first embodiment as one embodiment of the present invention.

Figure 3A:
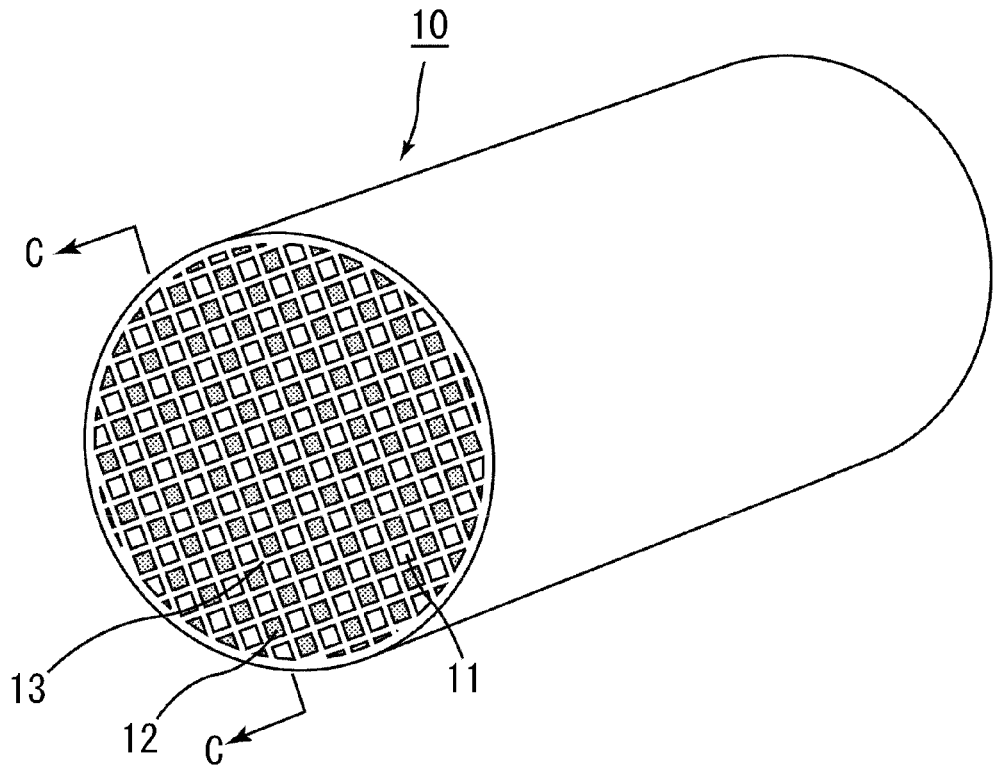
FIG. 3A is a perspective view that schematically shows one example of the honeycomb structure according to an embodiment of the present invention.
Figure 3B:
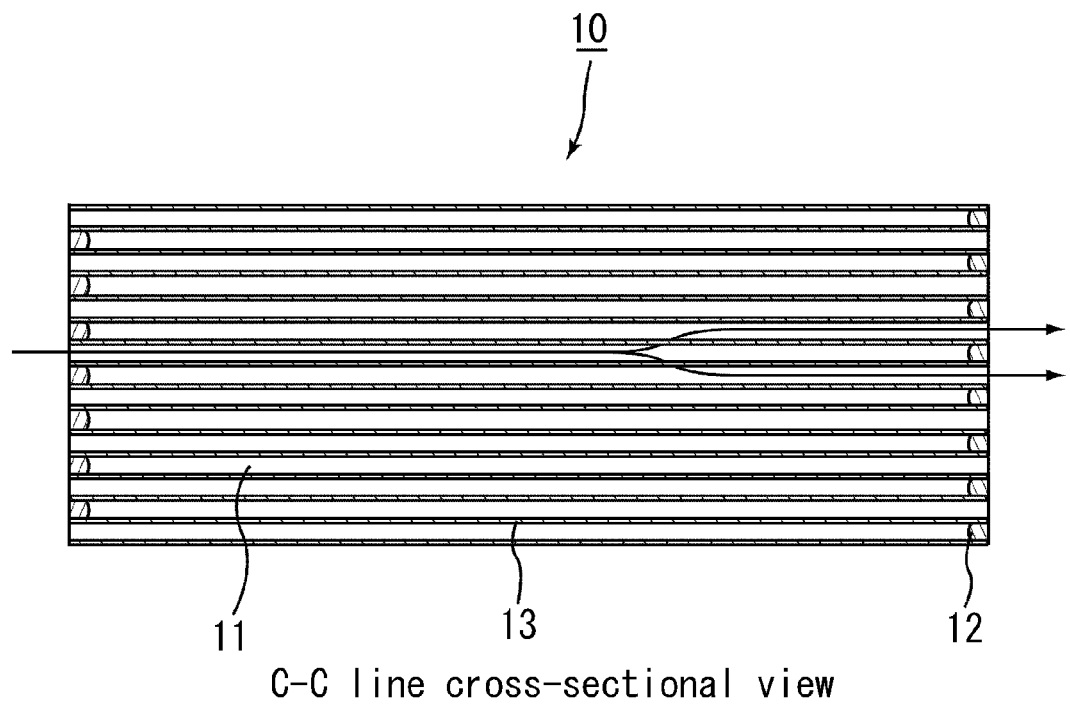
FIG. 3B is a cross-sectional view (the C-C line cross-sectional view of FIG. 3A) that shows a cross section of the cell wall exposed by cutting the cell wall in parallel with the longitudinal direction of the honeycomb structure of FIG. 3A.

FIG. 3A is a perspective view that schematically shows one example of the honeycomb structure according to an embodiment of the present invention. FIG. 3B is a cross-sectional view (the C-C line cross-sectional view of FIG. 3A that schematically shows one example of a cross section of the cell walls exposed by cutting the cell walls of the honeycomb structure shown in FIG. 3A in parallel with the longitudinal direction.

As shown in FIG. 3A, a honeycomb structure 10 includes aluminum titanate, and has a substantially round-pillar shape. As shown in FIG. 3B, cells 11 are formed along the longitudinal direction of the honeycomb structure 10 with cell walls 13 interposed between the cells 11.

In addition, each of the cells 11 is sealed with a plug 12 at either one end.

The plug 12 is made of the substantially same material as that of the honeycomb structure 10, namely, aluminum titanate. In the honeycomb structure 10, each of the cells 11 is sealed with the plug 12 at either one end so that exhaust gas is prevented from leaking from one end of each of the cells 11. Thus, exhaust gas (indicated by the arrow in FIG. 3B) flowing into one cell is always caused to pass through a cell wall 13 which separates the one cell from other cells, and then is discharged from the other cells. When the exhaust gas passes through the cell wall 13, PM is captured in the cell wall 13, and thus the exhaust gas is purified.

Detail observation of the inside of the cell wall 13 of the honeycomb structure clarifies that the cell wall 13 of the honeycomb structure has the substrates 21 made of aluminum titanate and the pores 23; that is, the honeycomb structure has a porous structure.

The honeycomb structure 10 has an average pore diameter of from about 10 μm to about 20 μm. The average pore diameter is an average value of the pore diameters of the pores measured by mercury porosimetry.

In the honeycomb structure of the present embodiment, a total volume of pores having a pore diameter in the range from (the average pore diameter−about 2 μm) to (the average pore diameter+about 2 μm) in a pore diameter distribution is about 60% or more of the whole pore volume measured by mercury porosimetry.

For example, in the case of the honeycomb structure 10 having an average pore diameter of 15 μm, about 60% or more of the pores has a pore diameter of from about 13 μm to about 17 μm.

In addition, the honeycomb structure 10 has a porosity measured by mercury porosimetry of from about 40% to about 60%.

The following will specifically describe measuring methods for characteristic values such as an average pore diameter, porosity, and pore diameter distribution of the pores formed in the honeycomb structure.

A honeycomb structure is cut so as to provide a 1-cm width cubic sample. The pore diameter and pore distribution (pore diameter distribution) of the obtained sample are measured by a pore distribution measuring apparatus using mercury porosimetry in the range of a pore diameter of 0.2 to 500 μm. The average pore diameter and porosity of the obtained sample are determined from the measurement of the pore diameter distribution.

With respect to the honeycomb structure 10, a cross section in parallel with the longitudinal direction of the cell wall 13 is photographed by an SEM to provide a partially enlarged image thereof. The partially enlarged image is converted into a binary image of substrate portions which indicate the substrates and of pore portions which indicate the pores. The binary image is divided into rectangularly-divided images in the direction parallel to the thickness direction of the call wall 13. As compared with the porosity of the honeycomb structure, the area ratio of the pore portions to the whole area in each of the rectangularly-divided images is in the range from (the porosity−about 25%) to (the porosity+about 25%).

For example, in the case of the honeycomb structure 10 having a porosity of 50%, the area ratio of the pore portions is in the range from about 25% to about 75%.

The following will detailedly describe a method for binarizing the image of the honeycomb structure and a method for measuring the area ratio of the pore portions in the binary image of the honeycomb structure.

First, a cross section in parallel with the longitudinal direction of the cell wall of the honeycomb structure is photographed by an SEM at a magnification of 150× to provide a partially enlarged image of the cross section of the cell wall. In the partially enlarged image, brighter portions indicate portions (pixels) where the substrates densely exist, and darker portions indicate portions (pixels) corresponding to pore portions where the substrates hardly exist. Thus, the resulting image has contrast in luminance.

Next, in the partially enlarged image thus obtained, each of the pixels having a certain degree of luminance is classified at a predetermined threshold value so that the brighter pixels are blackened and the darker pixels are whitened. That is, the substrates are blackened as substrate portions and the pores are whitened as pore portions. Thus, the partially enlarged image is binarized to provide a binary image of the cross section of the cell wall.

On the binary image which is generated from the partially enlarged image of the cross section of the cell wall and which consists of the substrate portions and the pore portions, lines are drawn in the direction parallel to thickness direction of the cell wall at a predetermined width to divide the binary image into rectangularly-divided images.

In each of the rectangularly-divided binary images, the area of the whole rectangular region, the area of the substrate portions in the rectangular region (the sum of the areas of all the substrate portions), and the area of the pore portions in the rectangular region (the sum of the areas of all the pore portions) are measured.

Here is calculated the ratio (%) of the area of the pore portions in the rectangular region to that of the whole rectangular region.

In the present description, the distance between the lines for dividing the binary image into a rectangular region is 25 μm unless otherwise mentioned.

The porosity of the honeycomb structure and the area ratio of the pore portions are then compared.

The following will describe a method for manufacturing the honeycomb structure 10 of the present embodiment.

Powders of $Al_2O_3$ and $TiO_2$ and additives such as MgO and alkaline feldspar are mixed to prepare a material powder. The obtained material powder is heated, dried, and sintered to manufacture a sintered body of aluminum titanate.

The prepared sintered body of aluminum titanate is pulverized and classified to manufacture a coarse powder of aluminum titanate.

A separately manufactured sintered body of aluminum titanate is also pulverized and classified at a different degree of pulverization and classification to manufacture a fine powder of aluminum titanate.

The coarse powder of aluminum titanate, the fine powder of aluminum titanate, a pore-forming agent, an organic binder, a plasticizer, a lubricant, and water are mixed and sufficiently stirred to prepare a mixture.

The porosity and the area ratio of the pore portions of the honeycomb structure to be manufactured are adjusted depending on the particle diameter or the particle-distribution index of the coarse powder of aluminum titanate or the particle diameter or the particle-distribution index of the pore-forming agent to be added upon preparing the mixture, or on the blending ratio of these powders.

The particle-distribution index of the coarse powder of aluminum titanate or the pore-forming agent is determined as follows: the particle diameter distribution of the coarse powder of aluminum titanate or the pore-forming agent is measured by a laser diffraction scattering method to determine a 90% particle diameter "D90", a 50% particle diameter "D50", and a 10% particle diameter "D10"; and then, the particle-distribution index is calculated by the following equation:

$$\text{Particle-distribution index}=(D90-D10)/D50$$

The mixture is extrusion-molded by an extrusion-molding apparatus to manufacture a long body of a round pillar-shaped honeycomb molded body having cells formed in the longitudinal direction with cell walls interposed therebetween.

The long body of the honeycomb molded body is cut into a predetermined length by a cutting apparatus provided with a cutting disc as a cutter. The honeycomb molded body thus obtained is then dried at from about 100° C. to about 150° C. for from about 1 minute to about 30 minutes under air atmosphere by a micro-wave drying apparatus and a hot-air drying apparatus.

Each of the cells of the honeycomb molded body is filled with a plug material paste at either one end so that predetermined cells of the honeycomb molded body are filled with the plug material paste made of the same material as that of the mixture.

The honeycomb molded body with each of the cells filled with the plug material paste at either one end is dried again. The honeycomb molded body is degreased at from about 250° C. to about 400° C. for from about 3 hours to about 15 hours under an oxygen concentration of about 5% by volume to air atmosphere in a degreasing furnace, and then is fired at from about 1300° C. to about 1600° C. for from about 3 hours to about 24 hours in a firing furnace.

The honeycomb structure of the present embodiment is manufactured through the aforementioned processes.

The effects of the honeycomb structure of the first embodiment of the present invention are listed below.

(1) The honeycomb structure of the present embodiment has no portion where the porosity is locally higher or lower than that of the honeycomb structure. Thus, exhaust gas is likely to more uniformly flow through the whole cell wall, and the cell wall of the whole honeycomb structure is effectively used to capture PM in the exhaust gas.

Consequently, the honeycomb structure including aluminum titanate tends to have a high PM capture efficiency.

(2) The honeycomb structure has no portion where the area ratio of the pore portions is more than about 25% higher than the porosity of the honeycomb structure; such a pore portion is considered to cause local reduction in strength of the cell wall and to serve as a starting point of a crack. Thus, the honeycomb structure including aluminum titanate tends to have a high breaking strength.

(3) In the honeycomb structure, pores occupying about 60% by volume or more of the whole pore volume have a pore diameter within (the average pore diameter±about 2 μm) in a pore diameter distribution. These pores are allowed to have a pore diameter within a range appropriate for capturing PM. As the honeycomb structure of the present embodiment has a pore diameter distribution within the aforementioned range, the honeycomb structure tends to have relatively more pores appropriate for capturing PM than others. Thus, the honeycomb structural body including aluminum titanate tends to have a high PM capture efficiency.

(4) The honeycomb structure has a porosity of from about 40% to about 60%, so that the honeycomb structure has a sufficient breaking strength and is less likely to be damaged.

Thus, the honeycomb structure including aluminum titanate tends to have a high breaking strength.

(5) In the honeycomb structure of the present embodiment, each of the cells is sealed at either one end. Thus, the honeycomb structure tends to be used as a filter for purifying exhaust gas.

Example 1

(1) Mixing Step 2,000 parts by weight of a coarse powder of aluminum titanate (average particle diameter: 25 μm, particle-distribution index: 2.0), 500 parts by weight of a fine powder of aluminum titanate (average particle diameter: 0.5 μm), 300 parts by weight of a pore-forming agent (spherical acrylic particles), 188 parts by weight of an organic binder (methylcellulose), 96 parts by weight of a plasticizer (UNILUB, produced by NOF Corp.), 44 parts by weight of a lubricant (glycerin), and 725 parts by weight of water were mixed and sufficiently stirred to prepare a mixture.

The pore-forming agent used herein had an average particle diameter of 45 μm and a particle-distribution index of 1.8.

(2) Extrusion-Molding Step

The mixture obtained in step (1) was charged into a cylinder from a mixture tank of a plunger-type extrusion molding apparatus. A piston was pushed in toward a die of a cylindrical shape so that the mixture was extruded through the die. Thereby, a long body of the round pillar-shaped honeycomb molded body including aluminum titanate was manufactured. In the long body of the round pillar-shaped honeycomb molded body, cells were formed along the longitudinal direction with cell walls interposed therebetween.

(3) Cutting Step

The long body of the honeycomb molded body obtained in step (2) was cut by a cutting apparatus provided with a cutting disc as a cutter. Thereby, a round pillar-shaped honeycomb molded body including aluminum titanate was obtained.

(4) Drying Step

The honeycomb molded body obtained in step (3) was dried at 120° C. for 20 minutes under air atmosphere by a micro-wave drying apparatus and a hot-air drying apparatus. Thereby, moisture in the honeycomb molded body was removed.

(5) Sealing Step

Plug material pastes made of the same material as that of the mixture prepared in step (1) were filled into predetermined cells of the honeycomb molded body so that each of the cells of the dried honeycomb molded body obtained in step (4) is filled with the plug material paste at either one end.

(6) Degreasing and Firing Step

The honeycomb molded body obtained in step (5) was again dried at 120° C. for 10 minutes under air atmosphere, then degreased at 300° C. for 12 hours under an oxygen concentration of 6% by volume in a degreasing furnace, and further fired at 1500° C. for 15 hours in a firing furnace.

Thereby, a honeycomb structure including aluminum titanate was manufactured. The honeycomb structure had a diameter of 143.8 mm and a length of 150 mm in the longitudinal direction, and included 46.5 pcs/cm$^2$ of cells which had a wall thickness of 0.25 mm and which were formed along the longitudinal direction.

Measurement of the characteristic values of the honeycomb structure by the aforementioned mercury porosimetry provided an average pore diameter of 15 μm and a porosity of 40%. The measurement further showed that pores occupying 60% by volume or more of the whole pore volume had a pore diameter of 13 to 17 μm in the pore diameter distribution.

According to the aforementioned binarization method of the partially enlarged image and measurement method of the ratio of the pore portions in the binary image of the honeycomb structure, the area ratio of the pore portions was measured as follows. The cell wall of the honeycomb structure was cut in parallel with the longitudinal direction; the cross section of the cell wall exposed thereby was photographed by an SEM at any five portions to prepare partially enlarged images; each of the partially enlarged images was converted into a binary image of the substrate portions (blackened portions) indicating the substrates and the pore portions (whitened portions) indicating the pores; the binary image was divided into rectangularly-divided images in the direction parallel to the thickness direction of the cell wall at a predetermined width; and the area ratio of the pore portions to the whole area in each of the rectangularly-divided images was calculated.

The area ratio of the pore portions varied in each of the rectangularly-divided images. The minimum value thereof was 16%, and the maximum value thereof was 62%. That is, the area ratio of the pore portions was within ±24% of the porosity (40%).

Measurement of the PM capture efficiency and breaking strength were performed on the honeycomb structure manufactured in the present example, and their characteristics were evaluated.

(Evaluation of PM Capture Efficiency)

Figure 4:
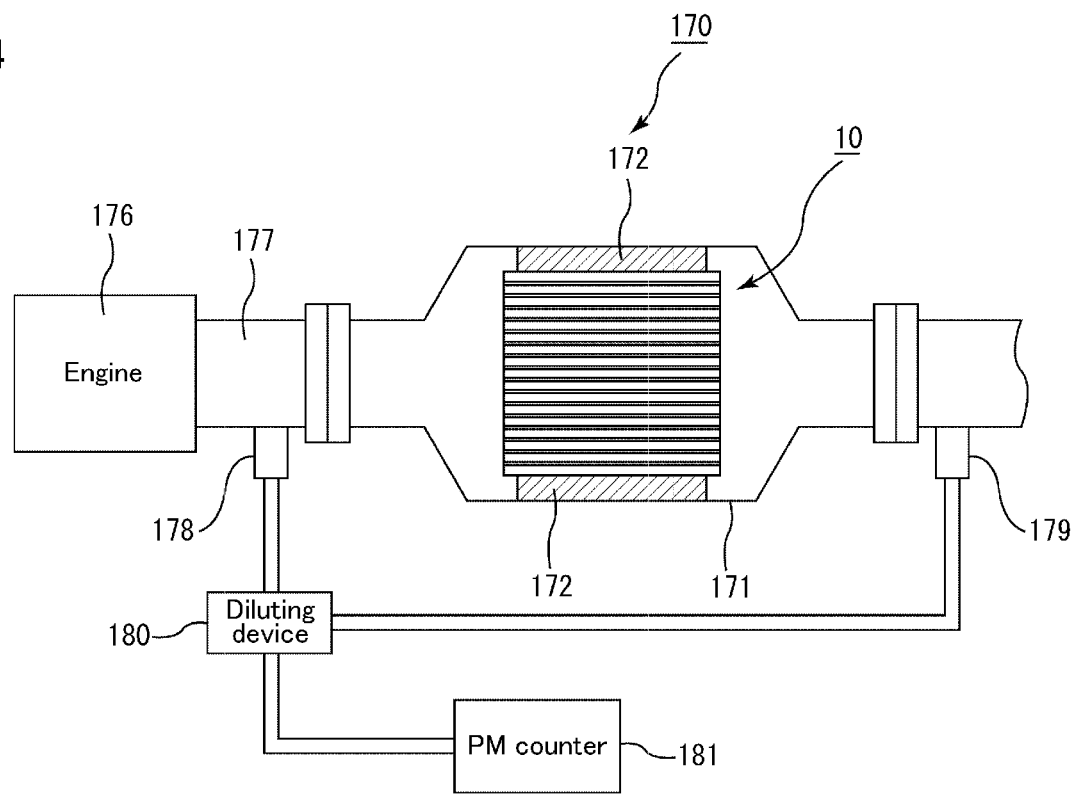
FIG. 4 is an explanatory view of a PM capture efficiency measuring apparatus.

The PM capture efficiency was measured with a PM capture efficiency measuring apparatus 170 shown in FIG. 4. FIG. 4 is an explanatory view of the PM capture efficiency measuring apparatus.

This PM capture efficiency measuring apparatus 170 is prepared as a scanning mobility particle sizer (SMPS) provided with a 2-L (liter) common-rail diesel engine 176; an exhaust-gas pipe 177 through which the exhaust gas from the engine 176 passes; a metal casing 171 which is connected to the exhaust-gas pipe 177 and which secures the honeycomb structure 10 wrapped with an alumina mat 172; a sampler 178 for sampling the exhaust gas before passing through the honeycomb structure 10; a sampler 179 for sampling the exhaust gas after passing through the honeycomb structure 10; a diluting device 180 for diluting the exhaust gas sampled by the samplers 178 and 179; and a PM counter 181 (a condensation particle counter 3022A-S, produced by TSI, Inc.) for measuring the amount of PM in the diluted exhaust gas.

The following will describe the measurement procedure. The engine 176 was driven at a rotational speed of 3,000 min and a torque of 30 Nm, and exhaust gas from the engine 176 was introduced into the honeycomb structure 10. At that time, the amount of PM before passing through the honeycomb structure 10 ($P_0$) and the amount of PM after passing through the honeycomb structure 10 ($P_1$) were determined by the PM counter 181. Then, the PM capture efficiency was calculated by the following equation.

PM capture efficiency(%)=$[(P_0-P_1)/P_0]\times 100$

As a result, the PM capture efficiency of the honeycomb structure manufactured in example 1 was 88%.

(Evaluation of Breaking Strength)

The honeycomb structure was cut to provide a test piece having a size of 34.3 mm square and a length of 150 mm. The test piece was subjected to a three-point bending test at a span of 130 mm and a velocity of 0.5 mm/min with an Instron 5582 in accordance with JIS R 1601. Thereby, the bending strength of the honeycomb structure was measured.

As a result, the breaking strength of the honeycomb structure manufactured in Example 1 was 6.5 MPa.

Tables 1-1 and 1-2 show the characteristics and evaluation results of the honeycomb structure manufactured in Example 1.

The contents of JIS R 1601 are incorporated herein by reference in their entirety.

Examples 2 and 3, Comparative Example 1

Except that the particle diameter and the particle-distribution index of the coarse powder of the aluminum titanate and the particle diameter and the particle-distribution index of the spherical acrylic particles as the pore-forming agent, both of which were contained in the material of the honeycomb structure, were changed as shown in Tables 1-1 and 1-2, the honeycomb structure was manufactured in the same manner as in Example 1.

The area ratio of the pore portions of the honeycomb structure thus manufactured was calculated, and the PM capture efficiency and the breaking strength were measured in the same manner as in Example 1.

Examples 4 to 6, Comparative Example 2

The composition for the mixture prepared in the mixing step was as follows: 1720 parts by weight of a coarse powder of aluminum titanate; 430 parts by weight of a fine powder of aluminum titanate; 360 parts by weight of a pore-forming agent (spherical acrylic particles); 188 parts by weight of an organic binder (methyl cellulose); 96 parts by weight of a plasticizer (UNILUB, produced by NOF Corp.); 44 parts by weight of a lubricant (glycerin); and 725 parts by weight of water.

Tables 1-1 and 1-2 show the particle diameters and particle-distribution indexes of the coarse powder of aluminum titanate and the particle diameters and particle-distribution indexes of the spherical acrylic particles which serve as the pore-forming agent in each of the examples and the comparative example. The coarse powder and the acrylic particles were contained in the material of the honeycomb structure.

Except that the firing time period was changed to 5 hours, a honeycomb structure was manufactured in the same manner as in Example 1.

The honeycomb structure thus manufactured had a porosity of 50%.

With respect to the manufactured honeycomb structure, the area ratio of the pore portions was calculated, and the PM capture efficiency and the breaking strength were measured in the same manner as in Example 1.

Examples 7 to 9, Comparative Example 3

The composition for the mixture prepared in the mixing step was as follows: 1300 parts by weight of the coarse powder of aluminum titanate; 325 parts by weight of the fine powder of aluminum titanate; 450 parts by weight of a pore-forming agent (spherical acrylic particles); 188 parts by weight of an organic binder (methyl cellulose); 96 parts by weight of a plasticizer (UNILUB produced by NOF Corp.); 44 parts by weight of a lubricant (glycerin); and 725 parts by weight of water.

Tables 1-1 and 1-2 show the particle diameters and particle-distribution indexes of the coarse powder of aluminum titanate and the particle diameters and particle-distribution indexes of the spherical acrylic particles which serve as the pore-forming agent in each of the examples and the comparative example. The coarse powder and the acrylic particles were contained in the material of the honeycomb structure.

Except that the firing time period was changed to 1 hour, a honeycomb structure was manufactured in the same manner as in Example 1.

The honeycomb structure thus manufactured had a porosity of 60%.

With respect to the manufactured honeycomb structure, the area ratio of the pore portions was calculated, and the PM capture efficiency and the breaking strength were measured in the same manner as in Example 1.

Tables 1-1 and 1-2 show the characteristics and evaluation results of the honeycomb structures manufactured in Examples 2 to 9 and Comparative Examples 1 to 3.

The term "difference between porosity and area ratio" in Tables 1-1 and 1-2 shows the value (%) having a larger absolute value out of the "difference between the porosity (%) and the maximum value (%) of the area ratio of pore portions" and the "difference between the porosity (%) and the minimum value (%) of the area ratio of pore portions".

TABLE 1-1

| | Manufacturing conditions | | | | Pore shapes | | | Evaluation results | |
|---|---|---|---|---|---|---|---|---|---|
| | Particle diameter of coarse powder (μm) | Particle-distribution index of coarse powder | Particle diameter of poreforming agent (μm) | Particle-distribution index of poreforming agent | Porosity (%) | Area ratio of pore portions (%) | | Difference between porosity and area ratio (%) | PM capture efficiency (%) | Breaking strength (MPa) |
| | | | | | | Minimum value | Maximum value | | | |
| Example 1 | 25 | 2.0 | 45 | 1.8 | 40 | 16 | 62 | 24 | 88 | 6.5 |
| Example 2 | 15 | 1.5 | 25 | 1.8 | 40 | 21 | 59 | 19 | 92 | 6.8 |
| Example 3 | 10 | 1.5 | 10 | 1.4 | 40 | 25 | 52 | 15 | 95 | 7.0 |
| Example 4 | 25 | 2.0 | 45 | 1.8 | 50 | 25 | 72 | 25 | 83 | 4.2 |
| Example 5 | 15 | 1.5 | 25 | 1.8 | 50 | 33 | 64 | 17 | 89 | 4.5 |
| Example 6 | 10 | 1.5 | 10 | 1.4 | 50 | 35 | 54 | 15 | 93 | 4.7 |
| Example 7 | 25 | 2.0 | 45 | 1.8 | 60 | 38 | 79 | 22 | 71 | 3.0 |
| Example 8 | 15 | 1.5 | 25 | 1.8 | 60 | 43 | 79 | 19 | 75 | 3.2 |
| Example 9 | 10 | 1.5 | 10 | 1.4 | 60 | 45 | 72 | 15 | 81 | 3.3 |

TABLE 1-2

| | Manufacturing conditions | | | | Pore shapes | | | Evaluation results | |
|---|---|---|---|---|---|---|---|---|---|
| | Particle diameter of coarse powder (μm) | Particle-distribution index of coarse powder | Particle diameter of poreforming agent (μm) | Particle-distribution index of poreforming agent | Porosity (%) | Area ratio of pore portions (%) | | Difference between porosity and area ratio (%) | PM capture efficiency (%) | Breaking strength (MPa) |
| | | | | | | Minimum value | Maximum value | | | |
| Comparative Example 1 | 25 | 2.0 | 60 | 2.0 | 40 | 15 | 67 | 27 | 79 | 5.9 |
| Comparative Example 2 | 25 | 2.0 | 60 | 2.0 | 50 | 24 | 78 | 28 | 76 | 3.7 |
| Comparative Example 3 | 25 | 2.0 | 60 | 2.0 | 60 | 38 | 86 | 26 | 60 | 2.5 |

Figure 5:
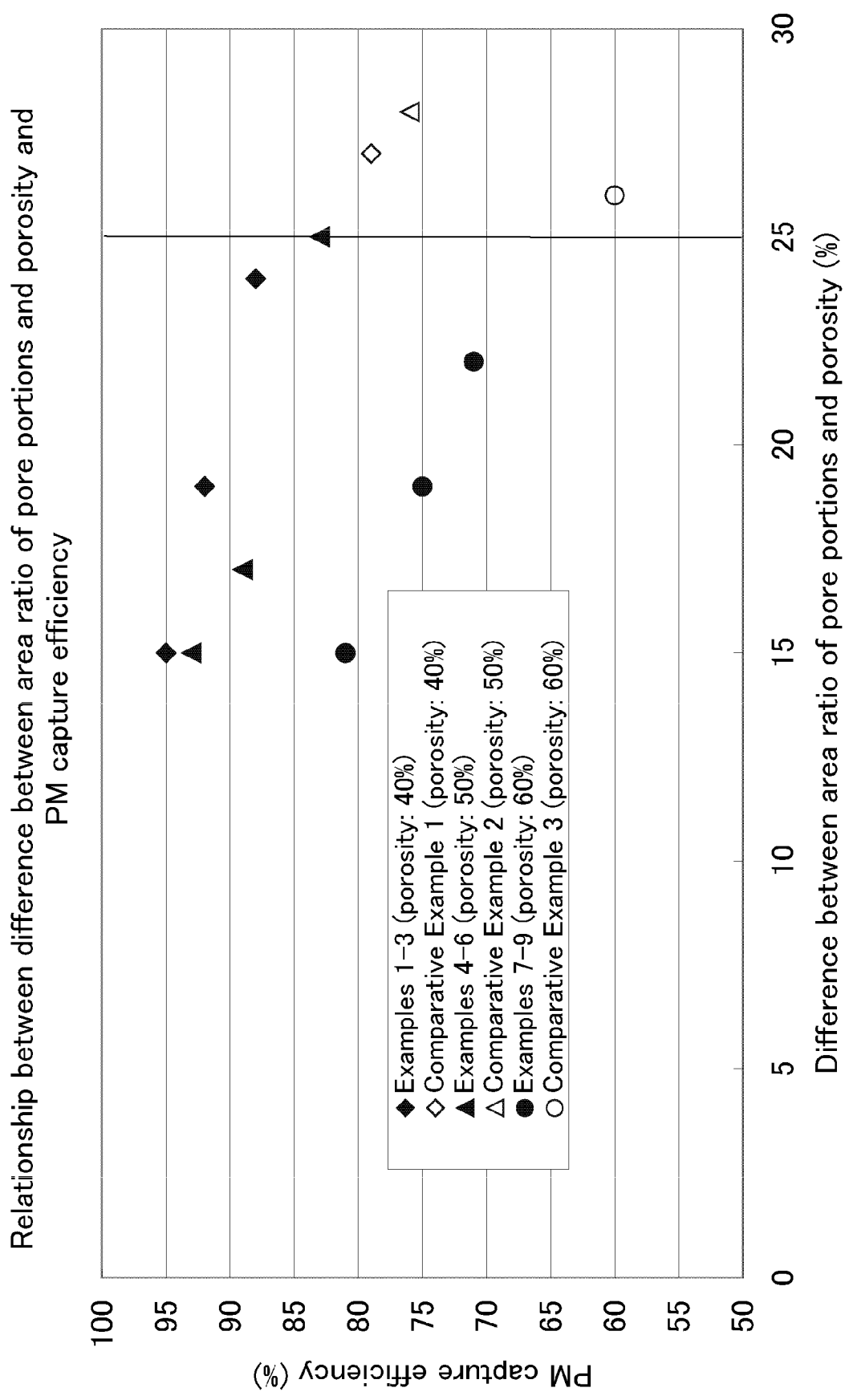
FIG. 5 is a graph that shows the relationship between a difference of the maximum or minimum value of the area ratio of the pore portions and a porosity and a PM capture efficiency according to each examples and comparative examples; the difference is indicated along the horizontal axis and the capture efficiency is indicated along the vertical axis.
Figure 6:
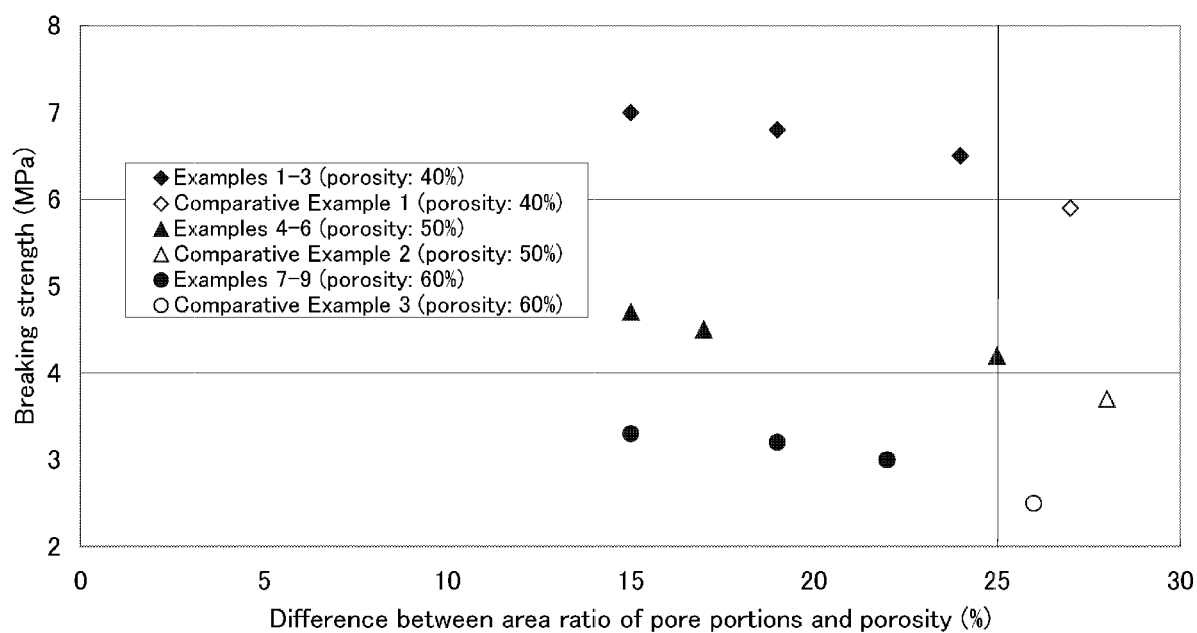
FIG. 6 is a graph that shows the relationship between a difference of the maximum or minimum value of the area ratio of the pore portions and a porosity and a breaking strength according to each examples and comparative examples; the difference is indicated along the horizontal axis and the breaking strength is indicated along the vertical axis.

FIG. 5 is a graph that shows the relationship between a difference between the maximum or minimum value of the area ratio of the pore portions and a porosity and a PM capture efficiency according to the examples and comparative examples; the difference is indicated along the horizontal axis and the PM capture efficiency is indicated along the vertical axis. FIG. 6 is a graph that shows the relationship between a difference between the maximum or minimum value of the area ratio of the pore portions and a porosity a breaking strength according to the examples and comparative examples; the difference is indicated along the horizontal axis and the breaking strength is indicated along the vertical axis.

With respect to the PM capture efficiencies and the breaking strengths, the honeycomb structures each having the same porosity in the examples and comparative examples are compared hereinbelow.

Examples 1 to 3 and Comparative Example 1 give the results obtained in the case of the honeycomb structures having a porosity of 40%. The honeycomb structures manufactured in Examples 1 to 3 each had a higher PM capture efficiency and breaking strength than those of the honeycomb structure manufactured in Comparative Example 1.

This may be because, in each of the honeycomb structures manufactured in Examples 1 to 3, the difference between the porosity of the honeycomb structure and the area ratio of the pore portions was as small as 25% or less; while in the honeycomb structure manufactured in Comparative Example 1, the difference was as large as over 25%.

A smaller difference provided a higher PM capture efficiency and breaking strength.

In the case of the honeycomb structures having a porosity of 50% (Examples 4 to 6 and Comparative Example 2) and the case of the honeycomb structures having a porosity of 60% (Examples 7 to 9 and Comparative Example 3), the honeycomb structures manufactured in the examples each had a difference of 25% or less. Thus, the honeycomb structures manufactured in the examples each had a higher PM capture efficiency and breaking strength than those of the corresponding honeycomb structure having the same porosity manufactured in the comparative examples.

Other Embodiments

The threshold value for binarization of the partially enlarged image taken by an SEM is not particularly limited. The threshold value may be appropriately selected depending on luminance so that the substrate portions and the pore portions are distinguished from each other after binarization. In addition, colors in the binary image are not particularly limited as long as the substrate portions and the pore portions can be distinguished from each other after binarization.

In the binarization of the image and the calculation of the area ratio of the pore portions in the binary image, part of or all of the operations, from photographing of a microscopic image to division of the binary image into rectangularly-divided images and calculation of the area ratio of the pore portions in the rectangular region to the whole area of the whole rectangular region, may be automatically performed by an apparatus with predetermined data preliminarily input.

The average pore diameter of the honeycomb structure according to the embodiments of the present invention is measured with a mercury porosimeter.

The porosity may be measured by a known method such as mercury porosimetry, a method based on weight, or the Archimedes' method.

The shape of the cross section perpendicular to the longitudinal direction of the honeycomb structure according to the embodiments of the present invention is not particularly limited to a substantially circular shape, and may be various shapes such as a substantially rectangular shape. The cross-sectional shape is desirably defined only by a curved line or by a curved line and a straight line.

Specific examples other than the substantially circular shape include a substantially elliptical shape, a substantially oval shape, a substantially race-track shape, a shape derived from a partially concave simple closed curve such as a substantially ellipse or a substantially oval (a concave shape), and the like.

The lower limit of the aperture ratio of the honeycomb structure according to the embodiments of the present invention is desirably about 50%, and the upper limit thereof is desirably about 75%.

An aperture ratio of about 50% or more is less likely to cause a high pressure loss when exhaust gas flows into and out from the honeycomb structure. An aperture ratio of about 75% or less is less likely to cause a low strength of the honeycomb structure.

The cell wall of the honeycomb structure according to the embodiments of the present invention desirably has a thickness of about 0.15 mm or more. A thickness of about 0.15 mm or more is less likely to cause a low strength of the honeycomb structure.

The desirable upper limit of the thickness of the cell wall is about 0.4 mm. A thickness of about 0.4 mm or less is less likely to cause a low aperture ratio and/or filtration area of the cells, which allows the honeycomb structure to have a low pressure loss.

The cell density of the honeycomb structure according to the embodiments of the present invention in the direction perpendicular to the longitudinal direction is not particularly limited. The desirable lower limit thereof is about 23.3 pcs/cm$^2$ (about 150 pcs/in$^2$), and the desirable upper limit thereof is about 93.0 pcs/cm$^2$ (about 600 pcs/in$^2$). The more desirable lower limit thereof is about 31 pcs/cm$^2$ (about 200 pcs/in$^2$), and the more desirable upper limit thereof is about 77.5 pcs/cm$^2$ (about 500 pcs/in$^2$).

The plane shape of the cell is not particularly limited to a substantially quadrangular shape, and may be any shape such as a substantially triangular shape, a substantially hexagonal shape, a substantially octagonal shape, a substantially dodecagonal shape, a substantially circular shape, a substantially elliptical shape, or a substantially star shape.

The coarse powder of aluminum titanate desirably has an average particle diameter of from about 5.0 μm to about 50.0 μm. The fine powder of aluminum titanate desirably has an average particle diameter of from about 0.1 μm to about 3.0 μm.

The mixing ratio of the coarse powder of aluminum titanate to the fine powder of aluminum titanate in the material powder is desirably from about (9:1) to about (6:4). The mixing ratio in the aforementioned range tends to prevent shrinkage in the firing step and make it easier to adjust the average pore diameter, pore diameter distribution, and porosity.

The organic binder to be used upon preparing the mixture is not particularly limited. Examples thereof include methyl cellulose, carboxymethyl cellulose, hydroxyethyl cellulose, polyethylene glycol, and the like. In particular, methyl cellulose is desirably used. The desirable amount of the organic binder to be blended is generally from about 1 part by weight to about 10 parts by weight per 100 parts by weight of the aluminum titanate powder.

The plasticizer and the lubricant to be used upon preparing the mixture are not particularly limited. Examples of the plasticizer include glycerin or the like. Examples of the lubricant include polyoxyalkylene compounds such as polyoxyethylene alkyl ethers and polyoxypropylene alkyl ethers, or the like.

Specific examples of the lubricant include polyoxyethylene monobutyl ether, polyoxypropylene monobutyl ether, and the like.

The mixture may be free from the plasticizer and the lubricant in some cases.

A dispersant solution may be used upon preparing the mixture. Examples of the dispersant solution include water, alcohols such as methanol, organic solvents such as benzene and toluene, and the like.

The mixture may contain a forming auxiliary.

The forming auxiliary is not particularly limited, and examples thereof include ethylene glycol, dextrin, fatty acids, fatty acid soaps, polyalcohols, and the like.

The temperature of the prepared mixture upon the molding step is desirably about 10° C. or less. This is because the temperature of about 10° C. or less is less likely to cause gelation of the organic binder.

Examples of the pore-forming agent to be added to the mixture include spherical acrylic particles, graphite, and the like.

The mixture may be free from the pore-forming agent in some cases.

The plug material paste for sealing the cells is not particularly limited, and is desirably one which is to be formed into a plug having a porosity of from about 40% to about 60% through post processes. The paste may be the same material as the aforementioned A catalyst may be supported on the honeycomb structure, if necessary. The catalyst to be supported on the honeycomb structure is not particularly limited, and examples thereof include noble metal elements, alkaline metal elements, alkaline earth metal elements, metal oxides, and the like. Each of these catalysts may be used alone, or two or more of these may be used in combination.

Examples of the noble metal element include platinum, palladium, rhodium, and the like. Examples of the alkaline metal element include potassium, sodium, and the like. Examples of the alkaline earth metal element include barium or the like. Examples of the metal oxide include $CeO_2$, $K_2O$, $ZrO_2$, $FeO_2$, $Fe_2O_3$, $CuO$, $CuO_2$, $Mn_2O_3$, $MnO$, a composite oxide represented by the formula of $A_nB_{1-n}CO_3$ (wherein $0 \leq n \leq 1$; A is La, Nd, Sm, Eu, Gd, or Y; B is an alkaline metal or an alkaline earth metal; and C is Mn, Co, Fe, or Ni), or the like.

The catalyst-supported honeycomb structure used as a honeycomb filter tends to lead to a low burning temperature of PM in the regenerating process.

The catalyst may be supported as follows: an alumina film having a high specific surface area is formed on the surface of the honeycomb structure; and the catalyst is applied to the surface of the alumina film.

The apparatus used upon forming a long body of the honeycomb molded body in the extrusion-molding step is not particularly limited. Examples thereof include a single-shaft screw-type extrusion molding apparatus, a multi-shaft screw-type extrusion molding apparatus, a plunger-type extrusion molding apparatus, and the like. In particular, the plunger-type extrusion molding apparatus is desirably used.

The drying apparatus used upon drying the honeycomb molded body after the cutting step or the honeycomb molded body after the sealing step is not particularly limited.

Examples thereof include a micro-wave heating drying apparatus, a hot-air drying apparatus, an infra-red drying apparatus, and the like. Two or more of these may be used in combination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb structure comprising:
    aluminum titanate;
    cell walls extending along a longitudinal direction of the honeycomb structure to form a plurality of cells between the cell walls;
    a porosity from about 40% to about 60%; and
    in a binary image of substrate portions and pore portions of each of the cell walls, an area ratio (%) of the pore portions to a whole area in a rectangularly-divided image is in a range from (the porosity–about 25%) to (the porosity+about 25%), wherein said binary image is converted from a microscopic image of a cross section of each of the cell walls in parallel with the longitudinal direction, and said rectangularly-divided image is formed by dividing the binary image in a direction parallel to a thickness direction of each of the cell walls at a predetermined width, and
    wherein the honeycomb structure is produced by using a mixture including a coarse powder of aluminum titanate having a particle-distribution index of 1.5-2.0, and a pore-forming agent having a particle-distribution index of 1.4-1.8, where the particle-distribution indices are calculated as being equal to (D90–D10)/D50, where D90 is a 90% particle diameter, D50 is a 50% particle diameter, and D10 is a 10% particle diameter.

2. The honeycomb structure according to claim 1, wherein the area ratio (%) of the pore portions is in a range from (the porosity–about 20%) to (the porosity+about 20%).

3. The honeycomb structure according to claim 1, wherein an average pore diameter is from about 10 μm to about 20 μm; and
    a total volume of pores having a pore diameter in a range from (the average pore diameter–about 2 μm) to (the average pore diameter+about 2 μm) in a pore diameter distribution is about 60% or more of a whole pore volume.

4. The honeycomb structure according to claim 1, wherein an average pore diameter is from about 10 μm to about 20 μm; and
    a total volume of pores having a pore diameter in a range from (the average pore diameter–about 2 μm) to (the average pore diameter+about 2 μm) in a pore diameter distribution is about 70% or more of a whole pore volume.

5. The honeycomb structure according to claim 1, wherein a porosity is from about 40% to about 50%.

6. The honeycomb structure according to claim 1, wherein each of the cells is sealed at either one end.

7. The honeycomb structure according to claim 1, wherein an aperture ratio of the honeycomb structure is from about 50% to about 75%.

8. The honeycomb structure according to claim 1, wherein a thickness of each of the cell walls is from about 0.15 mm to about 0.4 mm.

9. The honeycomb structure according to claim 1, wherein a catalyst is supported on the honeycomb structure.

10. The honeycomb structure according to claim 9, wherein said catalyst comprises at least one of noble metal elements, alkaline metal elements, alkaline earth metal elements, and metal oxides.

11. The honeycomb structure according to claim 1, wherein
    the honeycomb structure is prepared by
        mixing powders of $Al_2O_3$ and $TiO_2$, and an additive to prepare a material powder,
        sintering said material powder to manufacture a sintered body of aluminum titanate,
        pulverizing and classifying said sintered body of aluminum titanate to prepare said coarse powder of aluminum titanate,
        separately preparing another sintered body of aluminum titanate,
        pulverizing and classifying said another sintered body of aluminum titanate at a different degree of pulverization and classification to prepare a fine powder of aluminum titanate,
        preparing a mixture including said coarse powder of aluminum titanate and said fine powder of aluminum titanate,
        extrusion-molding said mixture to manufacture a honeycomb molded body, and
        firing said honeycomb molded body.

12. The honeycomb structure according to claim 11, wherein said additive comprises at least one of MgO and alkaline feldspar.

13. The honeycomb structure according to claim 11, wherein
    said coarse powder of aluminum titanate has an average particle diameter of from about 5.0 μm to about 50.0 μm, and
    said fine powder of aluminum titanate has an average particle diameter of from about 0.1 μm to about 3.0 μm.

14. The honeycomb structure according to claim 11, wherein a mixing ratio of said coarse powder of aluminum titanate to said fine powder of aluminum titanate in said mixture is from about (9:1) to about (6:4).

15. A method for manufacturing a honeycomb structure, the method comprising:
    molding a mixture to manufacture a honeycomb molded body having a plurality of cells longitudinally disposed substantially in parallel with one another with a cell wall between the cells; and
    firing the honeycomb molded body to manufacture a honeycomb structure,
    wherein the mixture comprises:
        a coarse powder of aluminum titanate having a particle-distribution index of 1.5-2.0, and a pore-forming agent having a particle-distribution index of 1.4-1.8, where the particle-distribution indices are calculated as being equal to (D90–D10)/D50, where D90 is a 90% particle diameter, D50 is a 50% particle diameter, and D10 is a 10% particle diameter, and
    wherein the honeycomb structure has:
        a porosity from about 40% to about 60%, and
        in a binary image of substrate portions and pore portions of each of the cell walls, an area ratio (%) of the pore portions to a whole area in a rectangularly-divided image is in a range from (the porosity–about 25%) to (the porosity+about 25%), wherein said binary image is converted from a microscopic image of a cross section of each of the cell walls in parallel with the longitudinal direction, and said rectangularly-divided image is formed by dividing the binary image in a direction parallel to a thickness direction of each of the cell walls at a predetermined width.

16. The method according to claim 15, wherein
the area ratio (%) of the pore portions is in a range from (the porosity−about 20%) to (the porosity+about 20%).

17. The method according to claim 15, wherein the honeycomb structure has:
an average pore diameter from about 10 μm to about 20 μm; and
a total volume of pores having a pore diameter in a range from (the average pore diameter−about 2 μm) to (the average pore diameter+about 2 μm) in a pore diameter distribution is about 60% or more of a whole pore volume.

18. The method according to claim 15, wherein the honeycomb structure has:
an average pore diameter from about 10 μm to about 20 μm; and
a total volume of pores having a pore diameter in a range from (the average pore diameter−about 2 μm) to (the average pore diameter+about 2 μm) in a pore diameter distribution is about 70% or more of a whole pore volume.

19. The method according to claim 15,
wherein the honeycomb structure has a porosity from about 40% to about 50%.

20. The method according to claim 15,
wherein each of the cells is sealed at either one end.

21. The method according to claim 15,
wherein an aperture ratio of the honeycomb structure is from about 50% to about 75%.

22. The method according to claim 15,
wherein a thickness of each of the cell walls is from about 0.15 mm to about 0.4 mm.

23. The method according to claim 15,
wherein a catalyst is supported on the honeycomb structure.

24. The method according to claim 23,
wherein said catalyst comprises at least one of noble metal elements, alkaline metal elements, alkaline earth metal elements, and metal oxides.

25. The method according to claim 15, wherein
the honeycomb structure is prepared by
mixing powders of $Al_2O_3$ and $TiO_2$, and an additive to prepare a material powder,
sintering said material powder to manufacture a sintered body of aluminum titanate,
pulverizing and classifying said sintered body of aluminum titanate to prepare said coarse powder of aluminum titanate,
separately preparing another sintered body of aluminum titanate,
pulverizing and classifying said another sintered body of aluminum titanate at a different degree of pulverization and classification to prepare a fine powder of aluminum titanate,
preparing a mixture including said coarse powder of aluminum titanate and said fine powder of aluminum titanate,
extrusion-molding said mixture to manufacture a honeycomb molded body, and
firing said honeycomb molded body.

26. The method according to claim 25,
wherein said additive comprises at least one of MgO and alkaline feldspar.

27. The method according to claim 25, wherein
said coarse powder of aluminum titanate has an average particle diameter of from about 5.0 μm to about 50.0 μm, and
said fine powder of aluminum titanate has an average particle diameter of from about 0.1 μm to about 3.0 μm.

28. The method according to claim 25,
wherein a mixing ratio of said coarse powder of aluminum titanate to said fine powder of aluminum titanate in said mixture is from about (9:1) to about (6:4).

* * * * *